Patented Feb. 22, 1944

2,342,429

UNITED STATES PATENT OFFICE 2,342,429

ALKALI-RESISTANT IRON BLUE

Irving Shack, Brooklyn, N. Y., and Edwin A. Wilson, Rutherford, N. J., assignors to Interchemical Corporation, New York, N. Y., a corporation of Ohio No Drawing. Application February 23, 1942, Serial No. 432,034

8 Claims. (Cl. 106—304)

This invention relates to iron blue pigments, and aims to provide an iron blue pigment highly resistant to the action of alkaline compounds and comprising an intimate mixture of ordinary iron blue with substantial quantities of nickel ferrocyanide, preferably coated with relatively small quantities of a basic nickel compound.

Iron blue is ordinarily made by precipitating a soluble ferrocyanide with a ferrous salt, and oxidizing the resultant precipitate to ferric ferrocyanide. This blue pigment is widely used in the coating and printing ink fields. One of its principal disadvantages is its unusually poor resistance to alkaline compounds. Even very weak alkalies will tend to destroy the color.

In our co-pending application Serial Number 348,990, filed July 31, 1940, now United States Patent No. 2,288,309, issued June 30, 1942, we described a method of improving the alkali resistance of iron blue by the precipitation thereon of small amounts, from 0.1% up, of a basic water-insoluble nickel compound. This coating of the blue produces a blue sufficiently resistant to alkali so that it can be used in automobile lacquers, for example, to produce blues which are not liable to color change in scrubbing with alkali soap—a marked improvement over ordinary blues.

We have now discovered that blues of much improved alkali resistance can be prepared by wet admixture of iron blue with nickel ferrocyanide, the entire pigment being preferably coated with a basic water-insoluble nickel compound, as taught in our co-pending application.

Our uncoated pigments possess the same order of alkali resistance as the coated blues described above; when further coated with a basic water-insoluble nickel compound, the pigments are sufficiently alkali-proof so that, when exposed to 5% aqueous caustic soda as prints in ordinary alkali resisting varnishes, the blue will not change color. Because of this extremely good resistance, our new blues can be used for linoleum and similar floor coverings which are repeatedly subjected to alkaline soaps, and in other places where iron blues have not heretofore been satisfactory.

The nickel salt may be precipitated simultaneously with the ferrous ferrocyanide, and go through the entire finishing operation; or it may be precipitated on the finished blue pulp, or may be precipitated separately, and mixed wet with the blue. The improved results are observable with about 2% of the nickel compound based on total pigment weight. The nickel compound renders the pigment greener and weaker progressively by dilution, so that we prefer not to use over about 20% of the nickel compound.

The nickel coating is done on the finished washed pigment, preferably by the use of a water-soluble nickel salt (e. g. chloride, sulfate, acetate, etc.) and a basic compound; 0.1% or more is necessary, and we prefer to restrict the amount of nickel so deposited to relatively small quantities, as pigment properties drop as the percentage of coated nickel increases. Up to 2% does not seriously affect color, but amounts in excess of 10% have a definitely serious effect, causing loss of color and strength.

Typical of the invention are the following examples:

*Example 1—Red shade blue*

413 pounds of yellow prussiate of soda are dissolved in 350 gallons of water at 100° F. This solution is run into a 2500 gallon tank equipped with a mechanical agitator running at 16 R. P. M.

356 pounds of copperas are dissolved in 350 gallons of water at 100° F., and run into the yellow prussiate of soda solution in fifteen minutes.

The mixture is stirred for one hour, and then brought to a boil. It is stirred at a boil for one hour, and then there is added 236 pounds of ammonium sulfate dissolved in 100 gallons of water at 150° F.

The slurry is boiled for fifteen minutes, after which time a mix of 215 pounds of 60° Bé. sulfuric acid and 2 pounds of 42° Bé. nitric acid in 30 gallons of water is added. Immediately after the addition of the acids, 9½ pounds of sodium bichromate in 25 gallons of water are added slowly.

The steam is then shut off, and the slurry is agitated for one hour. The color is washed by flooding and decantation until the supernatant liquor has an acid normality of about 1/125.

After the color has been washed, remove the supernatant liquor and add 30 pounds of yellow prussiate of soda in 25 gallons of water at 100° F. Then add 52 pounds of 26° Bé. ammonium hydroxide in 25 gallons of water. The slurry is stirred for ten minutes, and then there is added 90 pounds of sodium chlorate dissolved in 50 gallons of water at 150° F.

This is a typical red shade iron blue, and is extremely sensitive to alkali.

When 30 pounds of nickelous sulfate is added to replace 30 pounds of the copperas, our improved blue is obtained. The improved blue shows good alkali resistance.

Example 2—Green shade blue 344 pounds of yellow prussiate of soda and 72 pounds of ammonium sulfate are dissolved together in 1000 gallons of water at a boil. This solution is then run into a 2500 gallon tank equipped with a mechanical agitator running at 16 R. P. M.

340 pounds of copperas are dissolved in 120 gallons of water at a boil, and is run into the yellow prussiate of soda solution in five minutes.

The mixture is then heated to a boil, and boiled for one-half hour.

To the slurry is then added 168 pounds of sulfuric acid 60° Bé. concentrated, and is followed by 24 pounds of sodium chlorate dissolved in 20 gallons of water at 150° F.

The slurry is boiled for five minutes, and then the steam is shut off. The color is allowed to stand for fourteen hours before flooding. Wash by flooding and decantation until the supernatant liquor has an acid normality of about $\frac{1}{25}$.

Add enough ammonium hydroxide until the pH of the slurry is 6.8.

This blue, like Example 1 before the nickel treatment, is sensitive to alkali.

When 25 pounds of nickelous sulfate is used to replace 25 pounds of the copperas, our improved blue is obtained.

Example 3—Green shade blue 309 pounds of yellow prussiate of soda and 72 pounds of ammonium sulfate are dissolved together in 1000 gallons of water at a boil. This solution is then run into a 2500 gallon tank equipped with a mechanical agitator running at 16 R. P. M.

315 pounds of copperas are dissolved in 120 gallons of water at a boil, and is run into the yellow prussiate of soda solution in five minutes.

The mixture is then heated to a boil, and boiled for one-half hour.

To the slurry is then added 168 pounds of sulfuric acid 60° Bé. concentrated, and is followed by 24 pounds of sodium chlorate dissolved in 20 gallons of water at 150° F.

The slurry is boiled for five minutes, and then the steam is shut off. The color is allowed to stand for fourteen hours before flooding.

Wash by flooding and decantation until the supernatant liquor has an acid normality of about $\frac{1}{25}$.

Add enough ammonium hydroxide until the pH of the slurry is 6.8.

This blue, like the previous two examples before the nickel treatment, is sensitive to alkali.

When a precipitate of nickel ferrocyanide, made by dissolving 25 pounds of nickel sulfate in 75 gallons of water at 100° F., and run into a solution of 37½ pounds of sodium ferrocyanide in 75 gallons of water at 100° F., is added to the finished ferric ferrocyanide blue slurry, our improved blue is obtained.

The precipitated nickel ferrocyanide may also be added to the white paste before the oxidation; a similar alkali-resistant product is obtained.

Example 4

To the slurry of Example 1, made with a portion of the copperas replaced by nickelous sulfate add 10 pounds of nickelous sulfate dissolved in 30 gallons of water, and stir for fifteen minutes. Add 10 pounds of anhydrous di-sodium phosphate dissolved in 30 gallons of water, and stir for fifteen minutes. This is followed by the addition of 12 pounds of mineral oil emulsified in 50 gallons of water by 3 pounds of a sodium salt of a sulfonated mineral oil. Stir for one-half hour. Press. Dry. Pulverize.

The resultant coated pigment is highly alkali-resistant, and is useful, for example, in linoleums where present iron blue pigments are useless.

The alkali-resistant pigments of Examples 2 and 3 may be treated as in Example 4, to get the same marked improvement in alkali-resistance.

In general, the precipitation of the basic nickel compound as a coating should be carried out in accordance with the teaching of our co-pending application Ser. No. 348,990. Thus, precipitation of the basic water-insoluble nickel compound may take place from any source of water-soluble nickel, either as an inorganic salt, or as an organic salt such as the acetate. It may be deposited by simple adsorption of the finished pigment, or by precipitation with an alkaline compound. Preferably, from 0.5 to 10% of a non-volatile water-insoluble film-forming liquid such as mineral or fatty oils is deposited with it; but such a deposit is not essential.

While we have shown only a few examples of our invention, it is obviously applicable to all iron blues. The nickel ferrocyanide need only be thoroughly wet-mixed with the pigment at some stage before the iron blue is dried.

We claim:

1. An iron blue pigment of improved alkali resistance, comprising an intimate admixture of ferric ferrocyanide particles and nickel ferrocyanide particles, the nickel ferrocyanide comprising from about 2 to 20% of the mixture.

2. An iron blue pigment of improved alkali resistance, comprising an intimate admixture of ferric ferrocyanide particles and nickel ferrocyanide particles, the nickel ferrocyanide comprising from about 2 to 20% of the mixture, the pigment having deposited thereon small amounts, but at least 0.1% of nickel in the form of a basic water-insoluble compound.

3. An iron blue pigment of improved alkali resistance, comprising an intimate admixture of ferric ferrocyanide particles and nickel ferrocyanide particles, the nickel ferrocyanide comprising from about 2 to 20% of the mixture, the pigment having deposited thereon 0.1 to 2.0% of nickel in the form of a basic water-insoluble compound.

4. An iron blue pigment of improved alkali resistance, comprising an intimate admixture of ferric ferrocyanide particles and nickel ferrocyanide particles, the nickel ferrocyanide comprising from about 2 to 20% of the mixture, the pigment having deposited thereon 1.0 to 1.5% of nickel in the form of a basic water-insoluble compound.

5. An iron blue pigment of improved alkali resistance, comprising an intimate admixture of ferric ferrocyanide particles and nickel ferrocyanide particles, the nickel ferrocyanide comprising from about 2 to 20% of the mixture, the pigment having deposited thereon small amounts, but at least 0.1% of nickel in the form of a basic water-insoluble compound, the pigment particles being coated with 0.5 to 10% of a non-volatile water-insoluble film-forming liquid.

6. An iron blue pigment of improved alkali ferric ferrocyanide particles and nickel ferrocyanide particles, the nickel ferrocyanide comprising from about 2 to 20% of the mixture, the pigment having deposited thereon 0.1 to 2.0% of nickel in the form of a basic water-insoluble compound, the pigment particles being coated with 0.5 to 10% of a non-volatile water-insoluble film-forming liquid.

7. An iron blue pigment of improved alkali resistance, comprising an intimate admixture of ferric ferrocyanide particles and nickel ferrocyanide particles, the nickel ferrocyanide comprising from about 2 to 20% of the mixture, the pigment having deposited thereon 1.0 to 1.5% of nickel in the form of a basic water-insoluble compound, the pigment particles being coated with 0.5 to 10% of a non-volatile water-insoluble film-forming liquid.

8. The method of improving the alkali resistance of iron blue pigments which comprises wet mixing an iron blue pigment with from 2 to 20% of nickel ferrocyanide, based on the combined weight of the iron blue and nickel ferrocyanide.

IRVING SHACK.
EDWIN A. WILSON.

DISCLAIMER 2,342,429.—*Irving Shack*, Brooklyn, N. Y., and *Edwin A. Wilson*, Rutherford, N. J. ALKALI-RESISTANT IRON BLUE. Patent dated Feb. 22, 1944. Disclaimer filed May 26, 1945, by the assignee, *Interchemical Corporation*.

Hereby enters this disclaimer to claim 1 in said specification.

[*Official Gazette July 3, 1945.*]